(12) United States Patent
Okada

(10) Patent No.: US 8,082,093 B2
(45) Date of Patent: Dec. 20, 2011

(54) FUEL INJECTION CONTROL APPARATUS AND FUEL INJECTION CONTROL METHOD OF INTERNAL COMBUSTION ENGINE

(75) Inventor: Yoshihiro Okada, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 661 days.

(21) Appl. No.: 12/225,079

(22) PCT Filed: Mar. 14, 2007

(86) PCT No.: PCT/IB2007/000674
§ 371 (c)(1),
(2), (4) Date: Sep. 12, 2008

(87) PCT Pub. No.: WO2007/105103
PCT Pub. Date: Sep. 20, 2007

(65) Prior Publication Data
US 2009/0118974 A1    May 7, 2009

(30) Foreign Application Priority Data
Mar. 15, 2006    (JP) .................................. 2006-071666

(51) Int. Cl.
*F02D 41/06*    (2006.01)

(52) U.S. Cl. ........................ 701/113; 123/491

(58) Field of Classification Search .......... 701/103–105, 701/113; 123/299, 300, 491, 472, 478
See application file for complete search history.

(56) References Cited

U.S. PATENT DOCUMENTS

| | | | |
|---|---|---|---|
| 4,594,983 A | 6/1986 | Takahashi et al. | |
| 6,112,716 A | 9/2000 | Tachibana | |
| 6,283,093 B1 | 9/2001 | Lautenschuetz et al. | |
| 6,314,944 B1 | 11/2001 | Majima | |
| 7,201,127 B2 * | 4/2007 | Rockwell et al. | 123/179.16 |
| 7,370,628 B2 * | 5/2008 | Eves et al. | 123/295 |
| 2002/0129600 A1 | 9/2002 | Yamamoto et al. | |
| 2003/0183203 A1 | 10/2003 | Unland et al. | |
| 2005/0224055 A1 | 10/2005 | Wiese et al. | |
| 2008/0140300 A1 * | 6/2008 | Kuo et al. | 701/113 |
| 2008/0196691 A1 * | 8/2008 | Kihara et al. | 123/299 |

FOREIGN PATENT DOCUMENTS

| | | |
|---|---|---|
| DE | 196 05 407 A1 | 8/1997 |
| DE | 103 38 664 A1 | 3/2005 |
| DE | 10 2004 021 473 A1 | 11/2005 |
| EP | 0 838 584 A2 | 4/1998 |

(Continued)

*Primary Examiner* — Hai Huynh
(74) *Attorney, Agent, or Firm* — Oliff & Berridge, PLC

(57) ABSTRACT

A fuel injection control apparatus of an internal combustion engine is provided with a fuel injection valve that injects fuel directly into a combustion chamber and a controller. When the engine is cold started, a first fuel injection is performed and the injected fuel is spark ignited during the compression stroke, and a second fuel injection is performed during the expansion stroke. The controller selects, according to exhaust emissions, one of a first fuel injection rate and a second fuel injection rate that is lower than the first fuel injection rate as a fuel injection rate during at least the expansion stroke and injects fuel at the selected fuel injection rate. The second fuel injection rate is selected as the fuel injection rate of the second fuel injection and the start timing of the injection is advanced compared with the conventional injection start timing.

14 Claims, 8 Drawing Sheets

FOREIGN PATENT DOCUMENTS

| | | |
|---|---|---|
| EP | 0 936 353 A2 | 8/1999 |
| EP | 1 559 896 A2 | 8/2005 |
| JP | A-10-122015 | 5/1998 |
| JP | A-2000-110644 | 4/2000 |
| JP | A-2000-145586 | 5/2000 |
| JP | A-2002-295277 | 10/2002 |
| JP | A-2002-303189 | 10/2002 |
| JP | 2006-112364 * | 4/2006 |
| JP | A-2006-307703 | 11/2006 |
| WO | WO 01/79678 A2 | 10/2001 |
| WO | WO 03/087560 A1 | 10/2003 |

* cited by examiner

FUEL INJECTION CONTROL APPARATUS AND FUEL INJECTION CONTROL METHOD OF INTERNAL COMBUSTION ENGINE

BACKGROUND OF THE INVENTION

1. Field of the Invention

The invention relates to a fuel injection control apparatus of an internal combustion engine, and more specifically, to a fuel injection control apparatus and fuel injection control method of an internal combustion engine, which can improve emissions by simultaneously reducing particulate matter (smoke), nitrogen oxides (NOx), and hydrocarbons (HC).

2. Description of the Related Art

Japanese Patent Application Publication No. JP-A-2002-295277 and Japanese Patent Application Publication No. JP-A-10-122015, for example, describe fuel injection control apparatuses of an internal combustion engine which are provided with a fuel injection valve that injects fuel directly into the combustion chamber. These control apparatuses aim to increase the temperature of a catalyst when the engine is cold started by performing a first fuel injection and spark igniting the injected fuel during the compression stroke, and performing a second fuel injection during the expansion stroke.

With these technologies, however, if the injection timing is advanced, as shown in FIG. 11, the period before the exhaust valve opens becomes longer so the amount of unburned fuel decreases which in turn results in less HC. On the other hand, the temperature in the cylinder is high so combustion takes place rapidly. As the combustion temperature rises, so too does the amount of NOx. Further, when the fuel is combusted without being sufficiently mixed with air, the amount of smoke increases. FIG. 11 is a conceptual diagram showing the relationship between the start timing of the second injection and emissions.

On the other hand, if the injection timing is retarded, the period before the exhaust valves open becomes shorter, which results in unburned fuel being exhausted, thus increasing the amount of HC. Further, the temperature in the cylinder is low so combustion takes place slowly. As a result, the combustion temperature drops so the amount of NOx decreases. In addition, the mixture of fuel and air is promoted which improves combustion and thus reduces the amount of smoke.

Thus, advancing the second injection timing during the expansion stroke reduces HC but increases smoke and NOx, while retarding that injection timing reduces smoke and NOx but increases HC. That is, smoke, NOx, and HC were unable to be simultaneously reduced. Therefore, a fuel injection control apparatus of an internal combustion engine was desired that could improve emissions by simultaneously reducing smoke, NOx, and HC.

SUMMARY OF THE INVENTION

In view of the foregoing problems, this invention thus provides a fuel injection control apparatus and fuel injection control method of an internal combustion engine which improves emissions by simultaneously reducing smoke, NOx, and HC.

A first aspect of the invention relates to a fuel injection control apparatus of an internal combustion engine, which includes a fuel injection valve that injects fuel directly into a combustion chamber, and a controller which, when the internal combustion engine is cold started, performs a first fuel injection and spark ignites the injected fuel during a compression stroke and performs a second fuel injection during an expansion stroke. The controller selects, according to exhaust emissions, one of a first fuel injection rate (e.g. a reference injection rate) and a second fuel injection rate that is lower than the first fuel injection rate as a fuel injection rate to be used during at least the expansion stroke and injects fuel via the fuel injection valve at the selected fuel injection rate.

Thus, according to this first aspect, the fuel injection rate during the expansion stroke is set according to the exhaust emissions. More particularly, the fuel injection rate is reduced from a reference fuel injection (e.g. the first fuel injection rate) to the second fuel injection rate which inhibits rapid combustion so that less NOx and smoke are generated even when the injection quantity is the same. Therefore, the injection timing can be advanced which ensures a longer time until the exhaust valve opens, thereby promoting the combustion of unburned HC during that time. As a result, the amounts of NOx and smoke, as well as HC can be reduced.

Also, in the first aspect, the elected fuel injection rate may be realized by adjusting the fuel pressure of the fuel injection valve.

Accordingly, for example, reducing the fuel pressure reduces the injection rate which slows combustion of the fuel injected during the second fuel injection thus reducing smoke and NOx. Further, advancing the injection timing increases the time until the exhaust valve opens, giving the unburned HC time to be combusted.

Also, in the first aspect, the fuel injection valve may be structured such that a lift amount of the fuel injection valve can be variably controlled, and the controller may realize the fuel injection rate to be used during the expansion stroke by adjusting the lift amount.

Accordingly for example, atomization of the fuel is not adversely affected by fuel being injected at the reference injection rate achieved by using the reference valve lift in the first injection during the compression stroke so the required torque can be ensured by the ignition of that fuel. Also, a cylinder internal temperature is reached which enables the fuel of the fuel of the second injection to be diffusively combusted. Injecting the fuel at a low injection rate achieved by a small valve lift in the second injection during the expansion stroke slows combustion so less smoke and NOx are generated. In addition, advancing the start timing of the injection compared to the start timing when the reference valve lift is used reduces the amount of HC generated. That is, good emissions can be achieved while avoiding the possibility of adversely affecting torque and making torque fluctuation worse.

Also, a second aspect of the invention relates to a fuel injection control apparatus of an internal combustion engine, which includes a fuel injection valve that injects fuel directly into a combustion chamber; and a controller which, when the internal combustion engine is cold started, performs a first fuel injection and spark ignites the injected fuel during a compression stroke and performs a second fuel injection during an expansion stroke. The controller determines an octane rating of the fuel; and selects, according to the octane rating, one of a first fuel injection timing and a second fuel injection timing that is later than the first fuel injection timing as a fuel injection timing to be used during the expansion stroke, and injects fuel via the fuel injection valve at the selected fuel injection timing.

Therefore, according to the second aspect, the octane rating when knock occurs is estimated or learned and the injection timing of the second injection is changed according to the determined octane rating to improve emissions when the engine is cold started the next time. For example, when high octane fuel is used, the injection timing of the second injection may be retarded compared with when fuel having a lower octane rating is used in order to minimize the generation of smoke, NOx, and HC. Accordingly, good emissions can be realized. That is, good emissions can be achieved by changing the injection timing of the second injection depending on the octane rating of the fuel.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Hereinafter, example embodiments of the fuel injection control apparatus of an internal combustion engine according to the invention will be described in more detail with reference to the accompanying drawings.

First the schematic structure of an engine (i.e., an internal combustion engine) to which a first example embodiment of the invention can be applied will be described with reference to FIG. 2. Here, FIG. 2 is a sectional view schematically showing the structure of an engine having a so-called wall-guide structure which promotes the mixture of air and fuel with a cavity provided in the top surface of the piston.

Figure 2:
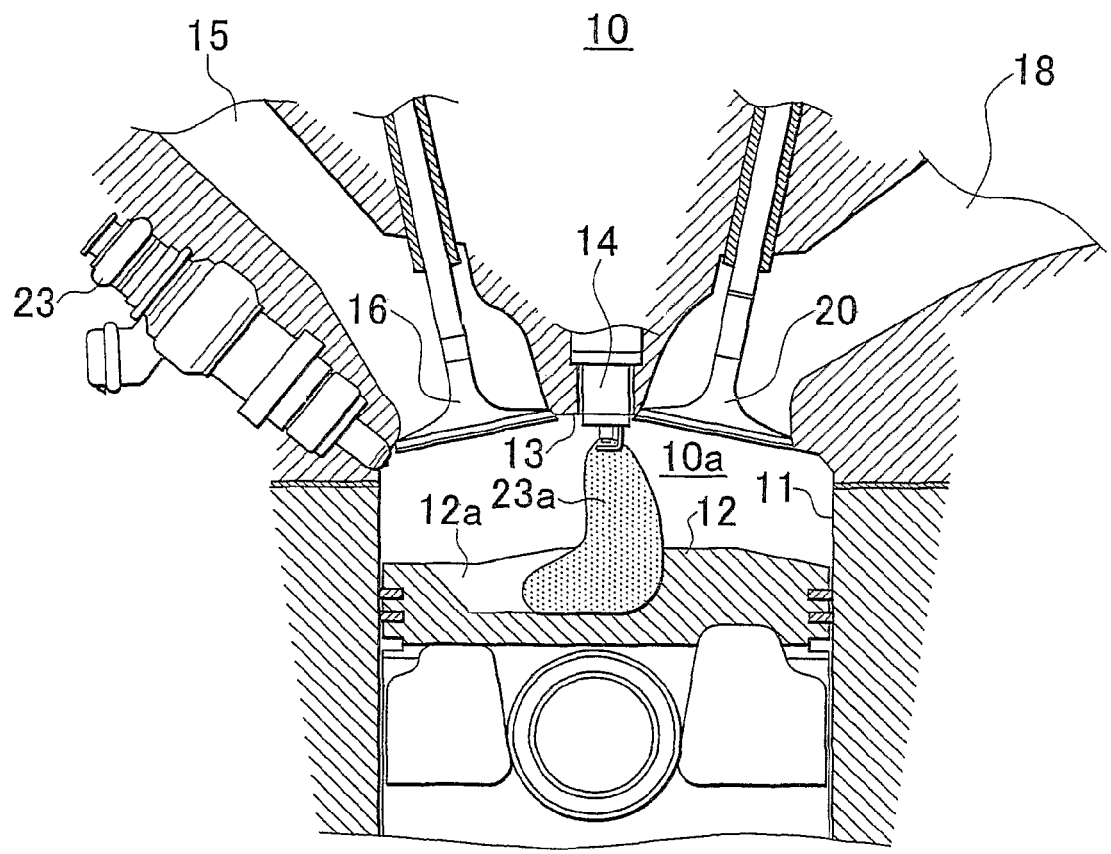
FIG. 2 is a sectional view schematically showing the structure of an engine.

As shown in FIG. 2, the engine 10 is a direct injection type four cycle gasoline engine in which fuel spray 23a is injected from a fuel injection valve 23 directly into a combustion chamber 10a.

That is, the combustion chamber 10a of the engine 10 is formed of a cylinder bore 11, a cylinder head 13, and a piston 12 arranged so as to be able to move up and down inside the cylinder bore 11. Also, a depressed cavity 12a for achieving stratified-charge combustion is formed in a portion on the intake side of the top surface of the piston 12.

Also, a spark plug 14 for igniting the air-fuel mixture is disposed in substantially the top center of the combustion chamber 10a. Also, an intake valve 16 is provided in an intake port 15 that opens into the combustion chamber 10a, and an exhaust valve 20 is provided in an exhaust port 18 that also opens into the combustion chamber 10a. These valves 16 and 20 are controlled open and closed by a variable valve timing mechanism.

Also, although not shown, a catalyst device for purifying smoke, NOx, and HC and the like in the exhaust gas is provided in an exhaust passage of the engine 10.

Each structural element such as the valves 16 and 20, the spark plug 14, and the fuel injection valve 23 and the like is controlled by an electronic control unit (ECU), not shown.

The engine 10 having a wall-guide structure is shown in FIG. 2 as the object to which the invention is applied, but the engine is not limited to this structure.

Figure 3:
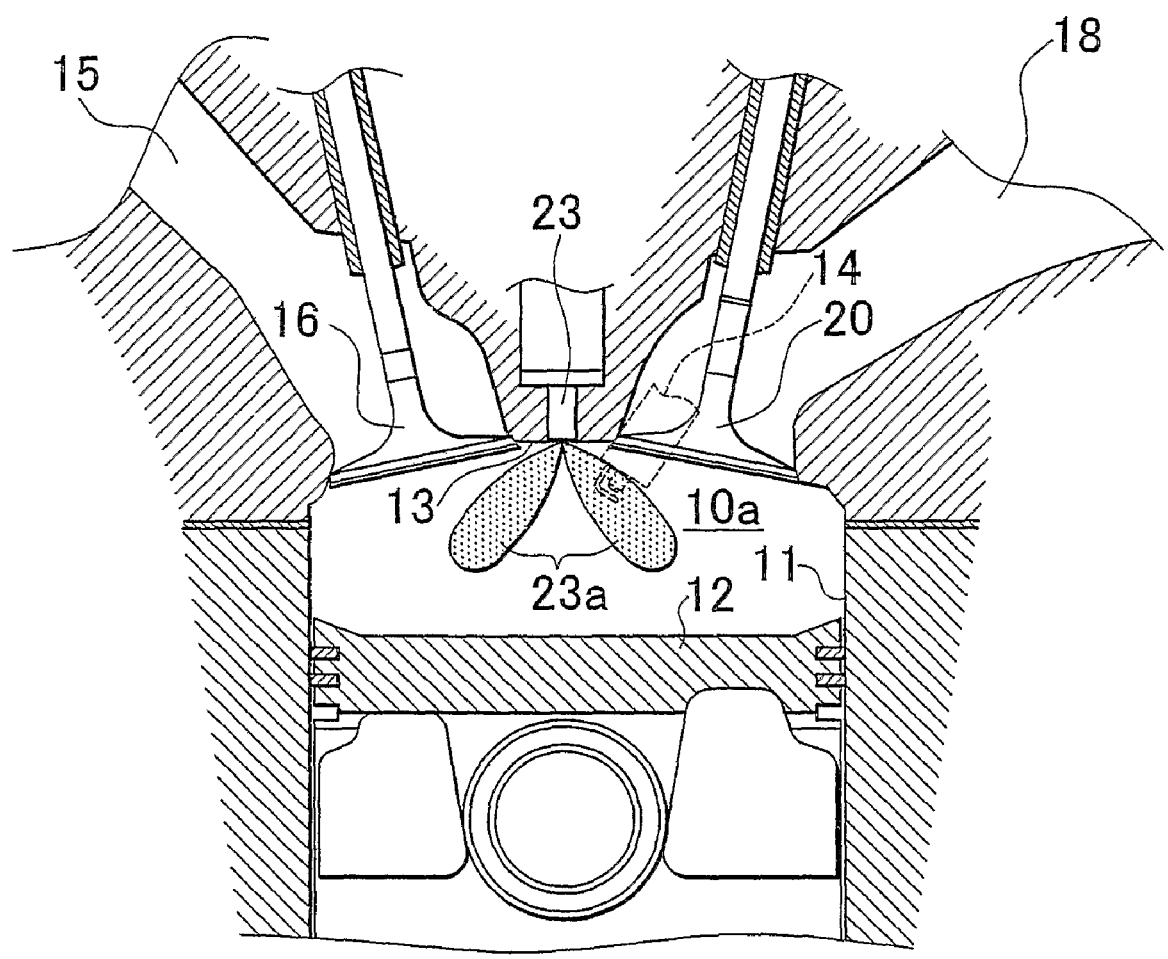
FIG. 3 is a sectional view of an engine having a spray-guide structure.

For example, as shown in FIG. 3, the invention may also be applied to an engine 10 having a so-called spray-guide structure in which the spark plug 14 is arranged near the fuel injection valve 23 and the air-fuel mixture formed by this fuel injection valve 23 is ignited. FIG. 3 is a sectional view of an engine having a spray-guide structure.

Also, although not shown in the drawings, the invention may also be applied to an engine having another structure in which the air-fuel mixture is led near the spark plug by the flow of air and then ignited.

Figure 1:
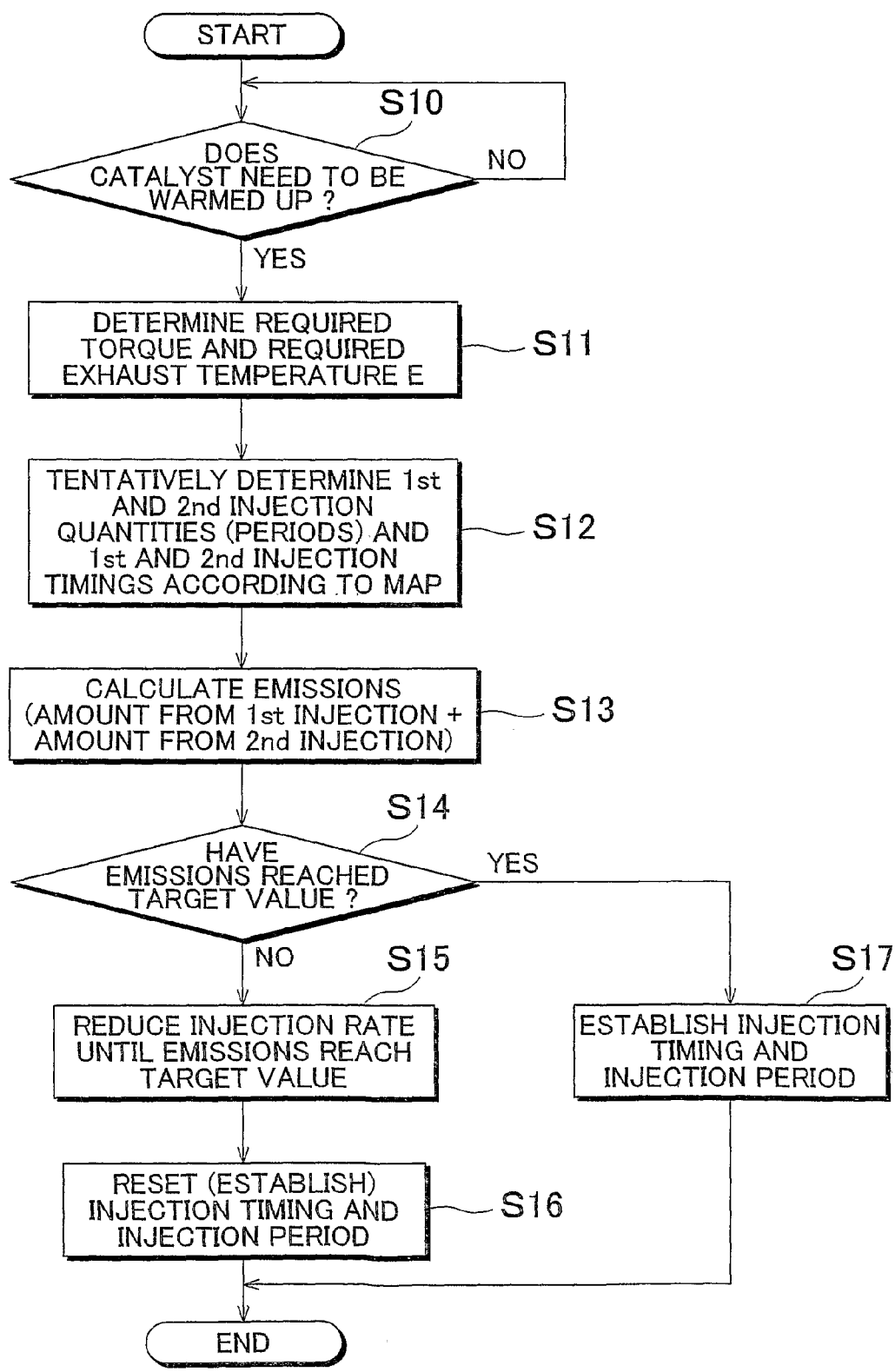
FIG. 1 is a flowchart of a control method according to a first example embodiment of the invention.

Next, a control method will be described with reference to FIG. 1. FIG. 1 is a flowchart of a control method according to the first example embodiment of the invention. The following control is executed by the ECU (which serves as the fuel injection control apparatus of an internal combustion engine) described above.

First it is determined whether the catalyst needs to be warmed up (step S10). If it is determined that the catalyst needs to be warmed up (i.e., YES in step S10), then a required torque T necessary for idling when warming up the catalyst, as well as a required exhaust temperature E necessary to warm up the catalyst are calculated and determined (step S11).

The required torque T and required exhaust temperature E are calculated comprehensively taking into account, for example, the time passed after the engine was started up, the temperature of the engine coolant, the temperature of the engine oil, the electrical load of auxiliary devices such as the alternator, and the load of power steering and the like.

If, on the other hand, it is determined that the catalyst does not need to be warmed up (i.e., NO in step S50), step S10 is repeated until it is determined that the catalyst does need to be warmed up.

Next, fuel injection quantities (injection periods) and injection timings of first (written as "1st" in the drawing) and second (written as "2nd" in the drawing) fuel injections are tentatively determined (step S12).

That is, the parameters of the first injection can be tentatively determined using a map, not shown, for example, from the required torque T determined in step S11.

Figure 4:
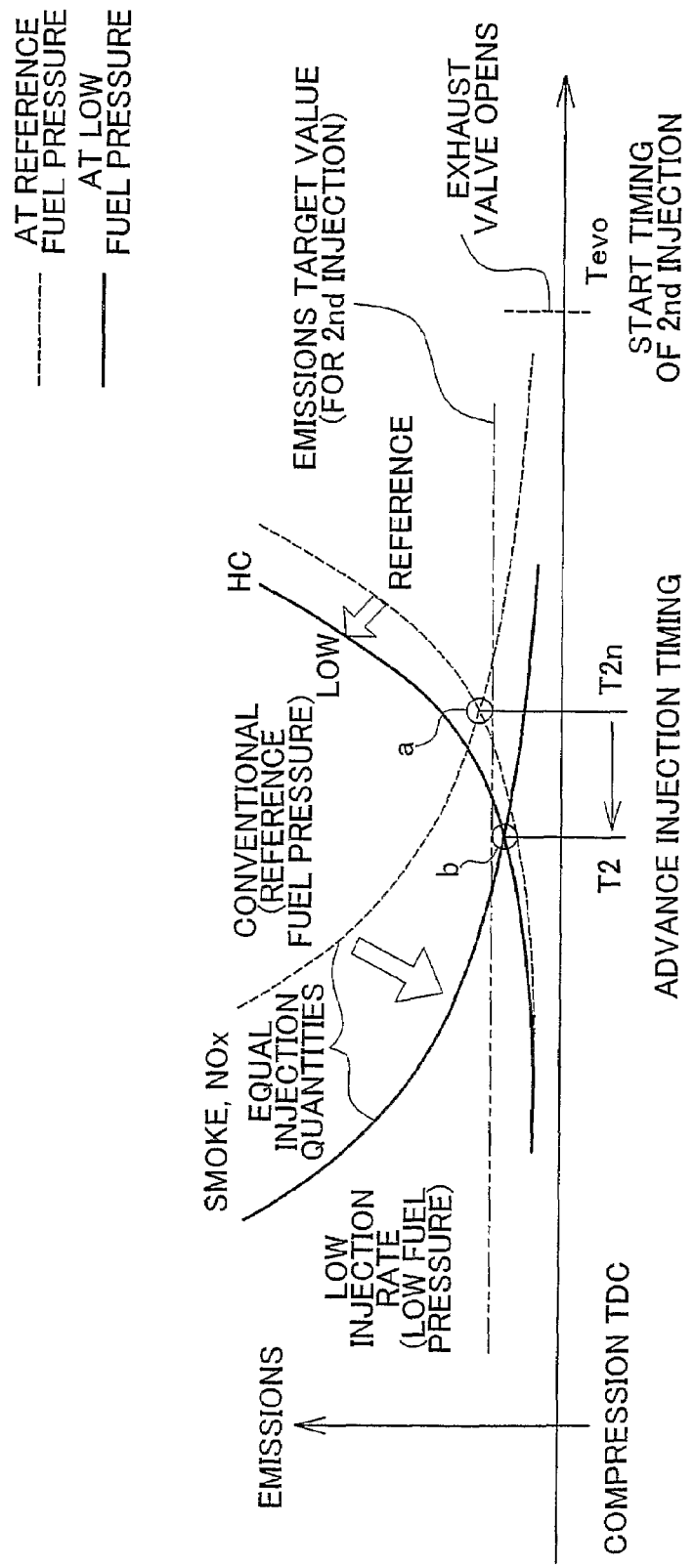
FIG. 4 is a conceptual diagram showing the relationship between emissions and the start timing of a second injection having the injection rate and injection quantity as parameters.

Also, for the parameters of the second injection, the required exhaust temperature E described above can be ensured at the reference fuel pressure and an injection timing which minimizes emissions (i.e., the amounts of smoke, NOx, and HC generated) can be tentatively determined using the map shown in FIG. 4.

Here, FIG. 4 is a conceptual diagram showing the relationship between emissions and start timing of the second injection with the injection rate and injection quantity as parameters. In the drawing, the broken line indicates a case in which the reference fuel pressure is used and the solid line indicates a case in which low fuel pressure is used, while the chain double-dashed line indicates an emissions target value. Also, the ignition timing is shown to be before TDC after the first injection. The opening timing Tevo of the exhaust valve 20 is also shown in the drawing.

Next, the emissions (the total amount for the first and second injections) are calculated using the map in FIG. 4 based on the value that was tentatively determined in step S12 (step S13). It is then determined whether the calculated value of the emissions has reached the target value (step S14).

If the calculated value of the emissions has reached the target value (i.e., YES in step S14), then the injection timing and injection period and the like that were tentatively determined in step S12 are established (step S17) and the control ends.

If, on the other hand, the calculated value of the emissions has not reached the target value (i.e., NO in step S14), then it is necessary to correct the injection timing and injection period that were tentatively determined in step S12. Therefore, as shown in FIG. 4, the injection rate of the second injection (i.e., the fuel injection quantity per unit time) is decreased so that the amount of emissions attributed to the second injection (reference character a) at the reference fuel pressure tentatively set in step S12 falls below (reference character b) the emissions target value (the chain double-dashed line) with an equivalent injection quantity (step S15).

Figure 5:
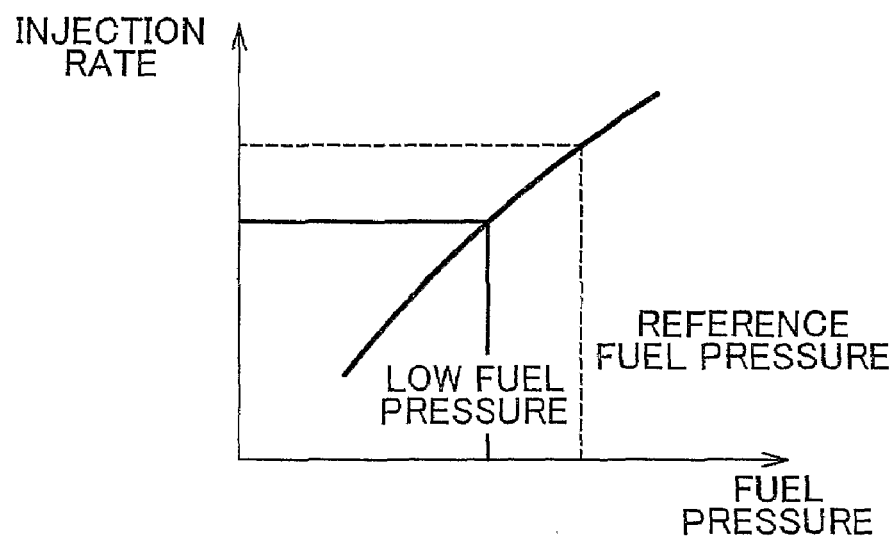
FIG. 5 is a map showing the relationship between fuel pressure and injection rate.

This injection rate can be decreased by reducing the fuel pressure of the fuel injection valve 23 a predetermined amount from the reference fuel pressure so that it becomes a low fuel pressure. FIG. 5 is a map showing the relationship between the fuel pressure and the injection rate.

The fuel pressure from the fuel injection valve 23 with a constant lift amount is the same for the first and second injections so when step S15 is executed, the first injection rate also decreases simultaneously.

Figure 6:
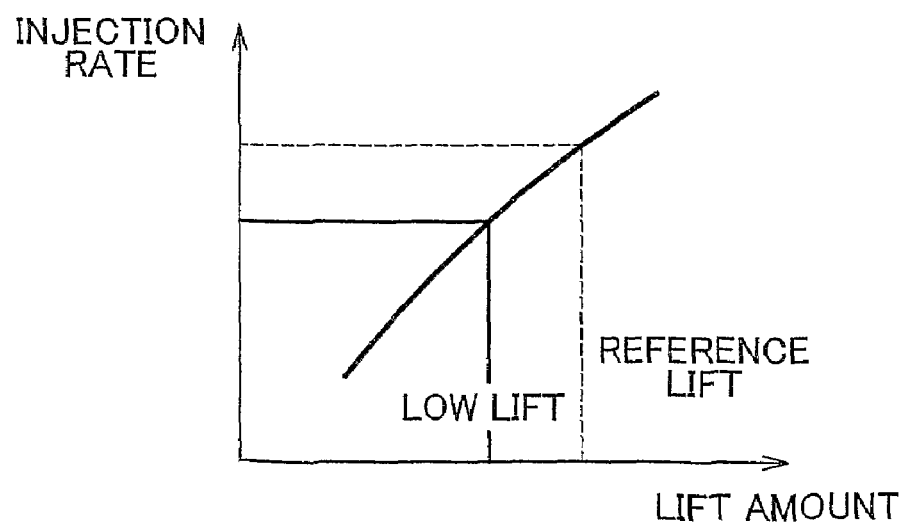
FIG. 6 is a map showing the relationship between lift amount and injection rate.

The injection rate of the second injection can also be decreased by reducing the lift amount of the fuel injection valve 23 a predetermined amount from the reference lift amount so that it becomes a low lift amount, as shown in FIG. 6 for example (see the second example embodiment described later).

In this case, the lift amount of the fuel injection valve 23 for the second injection can be controlled independently from the lift amount for the first injection. Therefore the lift amount of the fuel injection valve 23 for the second injection will not affect the injection rate for the first injection so in step S16, which will be described later, the injection timing and injection period of the first injection do not need to be reset. FIG. 6 is a map showing the relationship between the lift amount and the injection rate.

Continuing on, the injection rate was decreased by reducing the fuel pressure in step S15 so the injection timing and injection period are reset and the determined value is calculated (step S16). That is, for the first injection, the injection period is extended to make up for the reduction in the injection rate realized by the decrease in fuel pressure and the start timing of the injection is advanced along with that extension of the injection period.

Figure 7:
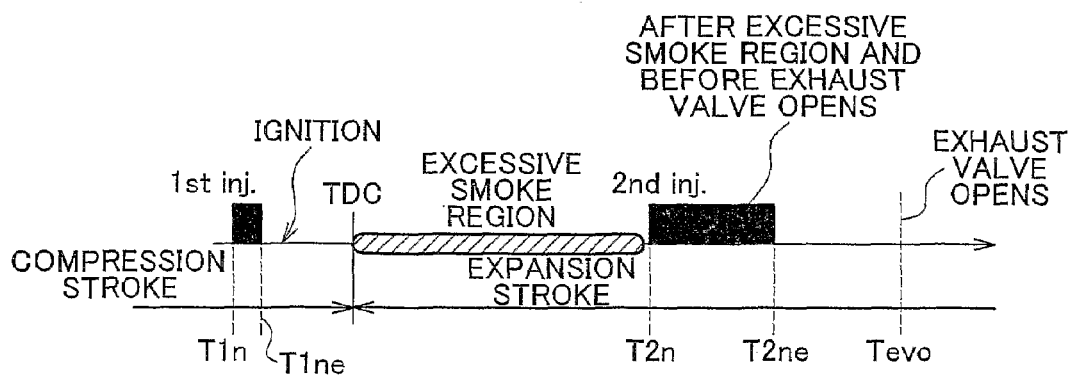
FIG. 7 is a time chart showing the concept of injection at a reference fuel pressure and ignition.
Figure 8:
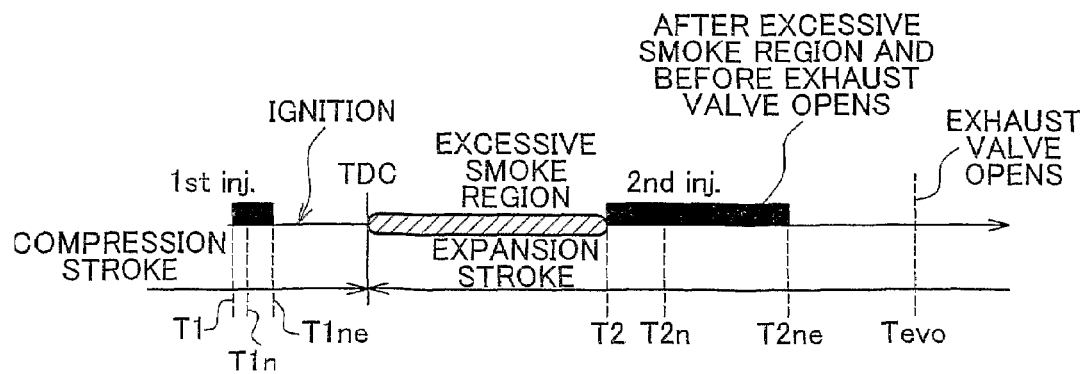
FIG. 8 is a time chart showing the concept of injection at a low fuel pressure and ignition.

For example, as shown in FIG. 8 in comparison with FIG. 7, the start timing T1n (see FIG. 7) of the first injection at the reference fuel pressure is advanced to the start timing T1 (see FIG. 8) at a predetermined low fuel pressure, and the injection period shown by T1n to T1ne when the reference fuel pressure is used is extended to the injection period as shown by T1 to T1ne when the predetermined low fuel pressure is used.

FIG. 7 is a time chart showing the concept of injection at the reference fuel pressure and ignition, and FIG. 8 is a time chart showing the concept of injection at the low fuel pressure and ignition. In these drawings, top dead center during the compression stoke of the piston 12 is denoted by TDC. Also, the first injection is denoted by "1st Inj" and the second injection is denoted by "2nd Inj", both of which are shown by black portions in the drawings.

Further, the area of those black portions represents the injection quantity, the horizontal axis represents the injection time, and the vertical axis represents the injection rate. Also, the region where a large amount of smoke tends to be produced is indicated by the excessive smoke region shown with hatching (i.e., slanted lines), and the timing at which the exhaust valve 20 opens is indicated by Tevo.

Moreover, the start timing of the first injection at the reference fuel pressure is denoted by T1n, the end timing of that first injection is denoted by T1ne, the start timing of the second injection is denoted by T2n, and the end timing of that second injection is denoted by T2ne. Also, the start timing of the first injection at the low fuel pressure is denoted by T1n, the end timing of that first injection is denoted by T1ne (the same as at the reference fuel pressure), the start timing of the second injection is denoted by T2, and the end timing of that second injection is denoted by T2ne (the same as the reference fuel pressure).

Also, the parameters of the second injection are determined based on the emissions map in FIG. 4 described above. That is, as shown in FIGS. 4, 7, and 8, the required exhaust temperature E is established with the low pressure set in step S15 and the start timing T2n (see FIG. 7) of the second injection at the reference fuel pressure is advanced to the start timing T2 (see FIG. 8) at the predetermined low fuel pressure, while the injection period shown by T2n to T2ne when the reference fuel pressure is used is extended to the injection period shown by T2 to T2ne when the predetermined low fuel pressure is used to minimize the emissions (i.e., the amounts of smoke, NOx, and HC generated) (step S16).

As described above, with the fuel injection control apparatus of an internal combustion engine according to this first example embodiment, the amount of smoke and NOx generated is reduced by slowing combustion of the fuel injected during the second fuel injection which is done by the reducing the fuel pressure and decreasing the injection rate. At the same time, the amount of HC generated is also reduced by advancing the start timing of the injection so that it is earlier than the reference start timing (i.e., when the reference fuel pressure is used).

Figure 9:
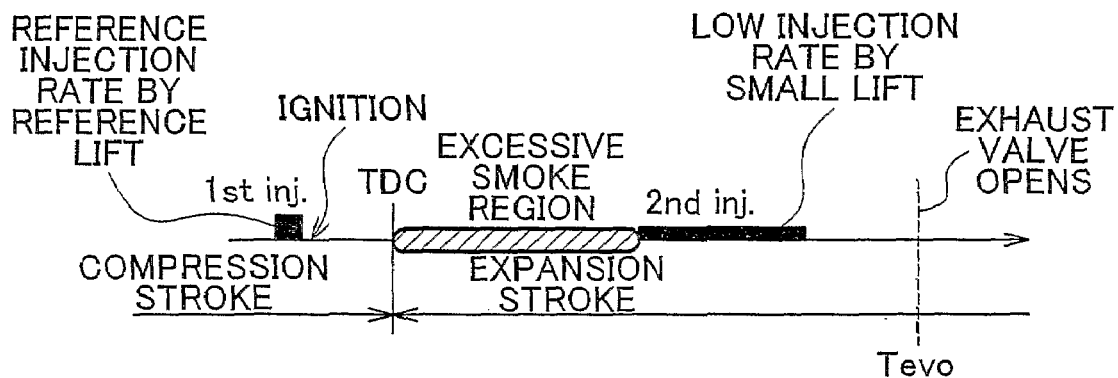
FIG. 9 is a time chart showing the concept of injection and ignition according to a second example embodiment of the invention.

FIG. 9 is a time chart showing the concept of injection and ignition according to a second example embodiment of the invention. In the following description, members which are the same as or correspond to members that have already been described are denoted by the same reference characters and redundant descriptions thereof will be omitted or simplified.

With the structure and control method of the first example embodiment, when the second injection fuel pressure is decreased, the first fuel pressure also decreases due to the structure of the fuel injection valve 23. Therefore, atomization of the fuel spray 23a is inhibited which may adversely affect the torque and make torque fluctuation worse, both of which depend largely on the first injection and the spark timing. The second example embodiment thus avoids this adverse affect on the torque and the like by reducing only the injection rate of the second injection.

That is, the second example embodiment employs a fuel injection valve 23 in which the lift amount of the needle, not shown, can be varied. Thus, as shown in FIG. 9, fuel injected in the first injection during the compression stroke is injected at the reference injection rate achieved with the reference valve lift and ignited, while the injection rate of the second injection is reduced by reducing the valve lift in only the second injection during the expansion stroke.

The other structure and control operations are substantially the same as in the first example embodiment so a redundant description thereof will be omitted. However, the lift amount of the fuel injection valve 23 during the second injection can be controlled independently from the lift amount during the first injection and thus does not affect the injection rate of the first injection. Therefore, in step S16 (i.e., controlling the injection rate of the second injection by reducing the fuel pressure) in the flowchart shown in FIG. 1 described above, it is not necessary to reset the injection timing and injection period of the first injection as it was in the first example embodiment.

As a result, atomization of the fuel is not adversely affected by fuel being injected at the reference injection rate achieved by the reference valve lift in the first injection during the compression stroke so the required torque can be ensured by the ignition of that fuel. Also, a cylinder internal temperature is reached which enables the fuel of the second injection to be diffusively combusted.

Injecting the fuel at a low injection rate achieved by a small valve lift in the second injection during the expansion stroke slows combustion so less smoke and NOx are generated. In addition, advancing the start timing of the injection so that it is earlier than the conventional start timing (i.e., when the reference valve lift is used) reduces the amount of HC generated.

As described above, the fuel injection control apparatus of an internal combustion engine according to the second example embodiment enables good emissions to be achieved while avoiding adversely affecting torque and making torque fluctuation worse.

Figure 10:
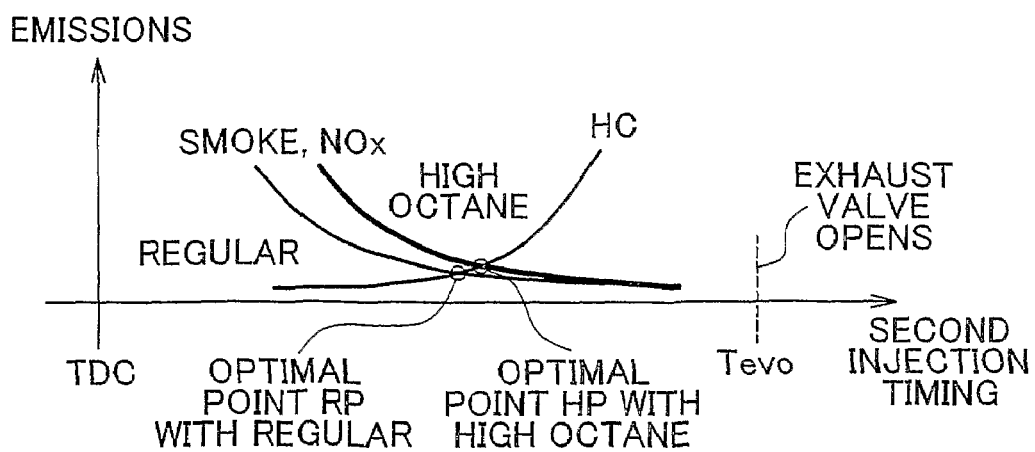
FIG. 10 is a conceptual diagram showing the relationship between emissions and the start timing of a second injection according to a third example embodiment.
Figure 11:
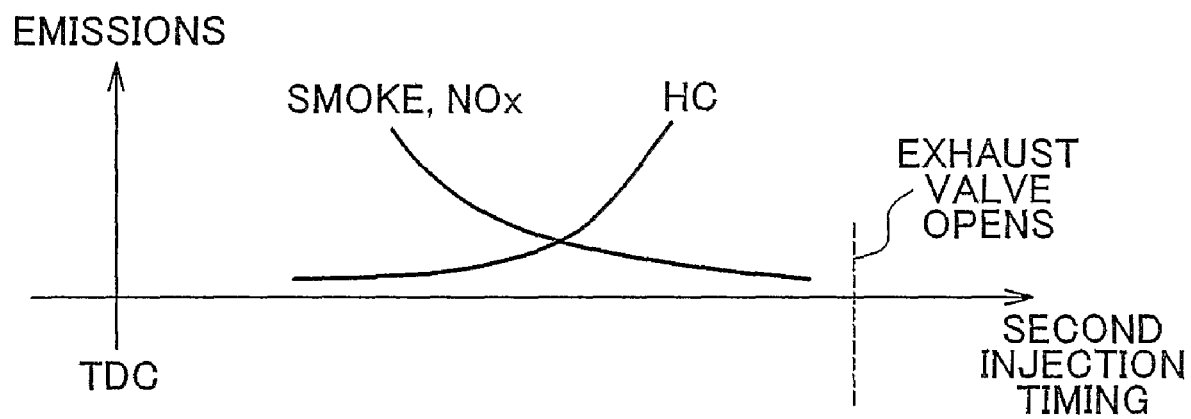
FIG. 11 is a conceptual diagram showing the relationship between emissions and the start timing of the second injection.

FIG. 10 is a conceptual diagram showing the relationship between emissions and the start timing of the second injection according to a third example embodiment of the invention. The drawing takes high octane gasoline with a high octane rating and regular gasoline with a normal octane rating, for example, and shows the concept of how the injection timing (i.e., the optimal point) of the second injection changes depending on the octane rating. In this third example embodiment as well, the invention can be applied to an engine 10 having the structure shown in FIG. 2 or FIG. 3 of the first example embodiment, for example.

The fuel spray 23a injected in the second injection during the expansion stroke described above autoignites and combusts from the heat inside the cylinder. It is commonly known that a higher octane rating of the fuel results in a longer ignition retard period which means that the period from the start of injection until autoignition will become longer. That is, the higher the octane rating the more fuel that will combust at the time of ignition so combustion is rapid. Therefore, when the start timing of the injection is the same, more smoke and NOx tend to be generated.

Thus in the third example embodiment, knock is detected by a knock sensor or the like when the engine 10 is operating at a low speed under a high load, and the octane rating when knock occurs is estimated or learned by an ECU (octane rating determining means), not shown. Then the next time the engine 10 is started at a low temperature, the injection timing of the second injection is changed according to the octane rating to improve emissions.

For example, as shown in FIG. 10, the injection timing of the second injection when high octane gasoline (fuel with a high octane rating) is used is retarded compared to when regular gasoline (i.e., fuel with a low octane rating) which has a lower octane rating than high octane gasoline is used, and the optimal point RP for the regular gasoline is set to the optimal point HP for the high octane gasoline in order to minimize smoke, NOx, and HC.

As described above, the fuel injection control apparatus of an internal combustion engine according to the third example embodiment can achieve good emissions by changing the injection timing of the second injection according to the octane rating of the fuel.

As described above, the fuel injection control apparatus of an internal combustion engine according to the invention is useful in a direct injection type four cycle gasoline engine, and is particularly well suited for an engine that aims to improve emissions by simultaneously reducing the amounts of smoke, NOx, and HC generated.

The invention claimed is:

1. A fuel injection control apparatus of an internal combustion engine, comprising:
   a fuel injection valve that injects fuel directly into a combustion chamber; and
   a controller that, when the internal combustion engine is cold started:
   performs a compression stroke fuel injection and causes ignition of the injected fuel during the compression stroke;
   evaluates exhaust emissions of the internal combustion engine;
   selects, according to the exhaust emissions, one of a first fuel injection rate and a second fuel injection rate that is lower than the first fuel injection rate as a fuel injection rate to be used during an expansion stroke fuel injection; and
   performs the expansion stroke fuel injection by injecting fuel via the fuel injection valve at the selected fuel injection rate.

2. The control apparatus according to claim 1, wherein the controller selects the first fuel injection rate when the exhaust emissions are less than a target value, and selects the second fuel injection rate when the exhaust emissions are equal to or greater than the target value.

3. The control apparatus according to claim 1, wherein the controller sets a fuel injection timing and a fuel injection period based on the selected fuel injection rate.

4. The control apparatus according to claim 3, wherein the controller advances a start timing of the expansion stroke fuel injection and extends the fuel injection period when fuel is injected at the second fuel injection rate compared to when fuel is injected at the first fuel injection rate.

5. The control apparatus according to claim 4, wherein an injection quantity of fuel injected during the expansion stroke fuel injection at the first fuel injection rate and the injection quantity of fuel injected during the expansion stroke fuel injection at the second fuel injection rate are equivalent.

6. The control apparatus according to claim 1, wherein the controller realizes the selected fuel injection rate by adjusting a fuel pressure of the fuel injection valve.

7. The control apparatus according to claim 6, wherein the controller performs the expansion stroke fuel injection at the second fuel injection rate by reducing the fuel pressure of the fuel injection valve to a lower fuel pressure than the fuel pressure of the fuel injection valve during the expansion stroke fuel injection at the first fuel injection rate.

8. The control apparatus according to claim 1, wherein the fuel injection valve is structured to adjust a fuel injection rate by a lift amount of a needle being variably controlled, and the controller realizes the selected fuel injection rate by adjusting the lift amount.

9. The control apparatus according to claim 8, wherein the controller performs the expansion stroke fuel injection at the second fuel injection rate by reducing the lift amount of the fuel injection valve to a smaller lift amount than the lift amount of the fuel injection valve during the expansion stroke fuel injection at the first fuel injection rate.

10. The control apparatus according to claim 1, wherein the controller sets a fuel injection rate that is lower than a fuel injection rate of the compression stroke fuel injection, as the second fuel injection rate.

11. A fuel injection control apparatus of an internal combustion engine, comprising:
- a fuel injection valve that injects fuel directly into a combustion chamber; and
- a controller that, when the internal combustion engine is cold started:
  - performs a compression stroke fuel injection and causes ignition of the injected fuel during the compression stroke;
  - determines an octane rating of the fuel;
  - selects, according to the determined octane rating, one of a first fuel injection timing and a second fuel injection timing that is later than the first fuel injection timing as a fuel injection timing to be used during an expansion stroke fuel injection; and
  - performs the expansion stroke fuel injection by injecting fuel via the fuel injection valve at the selected fuel injection timing during the expansion stroke.

12. The control apparatus according to claim 11, wherein the controller selects the second fuel injection timing when the octane rating is high.

13. A fuel injection control method of an internal combustion engine provided with a fuel injection valve that injects fuel directly into a combustion chamber, comprising:
- performing a compression stroke fuel injection and causing ignition of the injected fuel during the compression stroke;
- when the internal combustion engine is cold started:
  - evaluating exhaust emissions of the internal combustion engine;
  - selecting, according to the exhaust emissions, one of a first fuel injection rate and a second fuel injection rate that is lower than the first fuel injection rate as a fuel injection rate of an expansion stroke fuel injection; and
  - performing the expansion stroke fuel injection during the expansion stroke by injecting fuel via the fuel injection valve at the selected fuel injection rate.

14. A fuel injection control method of an internal combustion engine provided with a fuel injection valve that injects fuel directly into a combustion chamber, comprising:
- performing a compression stroke fuel injection and causing ignition of the injected fuel during the compression stroke; and
- when the internal combustion engine is cold started:
  - determining an octane rating of the fuel;
  - selecting, according to the determined octane rating, one of a first fuel injection timing and a second fuel injection timing that is later than the first fuel injection timing as a fuel injection timing to be used during an expansion stroke fuel injection; and
- performing the expansion stroke fuel injection by injecting fuel via the fuel injection valve at the selected fuel injection timing during the expansion stroke.

* * * * *